United States Patent
Baudasse et al.

(10) Patent No.: US 8,511,615 B2
(45) Date of Patent: Aug. 20, 2013

(54) DEPLOYABLE STRUCTURE FORMING AN ANTENNA EQUIPPED WITH A SOLAR GENERATOR FOR A SATELLITE

(75) Inventors: Yannick Baudasse, Grasse (FR); Stéphane Vezain, Mandelieu (FR)

(73) Assignee: Thales, Neuilly sur Seine (FR)

(*) Notice: Subject to any disclaimer, the term of this patent is extended or adjusted under 35 U.S.C. 154(b) by 44 days.

(21) Appl. No.: 13/333,859

(22) Filed: Dec. 21, 2011

(65) Prior Publication Data
US 2012/0325974 A1 Dec. 27, 2012

(30) Foreign Application Priority Data
Dec. 23, 2010 (FR) ...................................... 10 05094

(51) Int. Cl.
*B64G 1/22* (2006.01)
(52) U.S. Cl.
USPC ........................ 244/172.6; 244/173.3; 136/245
(58) Field of Classification Search
USPC ...................................................... 244/172.6
See application file for complete search history.

(56) References Cited

U.S. PATENT DOCUMENTS

| | | | | |
|---|---|---|---|---|
| 3,326,497 A * | 6/1967 | Michelson | ................. | 244/172.7 |
| 3,677,508 A * | 7/1972 | Dillard et al. | ............... | 244/172.7 |
| 3,733,758 A * | 5/1973 | Maier et al. | ...................... | 52/113 |
| 4,015,653 A * | 4/1977 | Slysh et al. | ................... | 160/213 |
| 4,116,258 A * | 9/1978 | Slysh et al. | ................... | 160/213 |
| 4,151,872 A * | 5/1979 | Slysh et al. | ................... | 160/213 |
| 4,725,025 A * | 2/1988 | Binge et al. | ................. | 244/172.6 |
| 4,832,113 A * | 5/1989 | Mims et al. | ....................... | 165/41 |
| 5,086,541 A | 2/1992 | Auternaud et al. | | |
| 5,319,905 A * | 6/1994 | Szirtes | ............................. | 52/108 |
| 5,520,747 A * | 5/1996 | Marks | ............................ | 136/245 |
| 5,660,644 A * | 8/1997 | Clemens | ........................ | 136/245 |
| 5,810,296 A * | 9/1998 | Izumi | ......................... | 244/172.9 |
| 5,833,176 A * | 11/1998 | Rubin et al. | ............... | 244/172.7 |
| 5,927,654 A * | 7/1999 | Foley et al. | ................ | 244/172.6 |
| 6,091,016 A * | 7/2000 | Kester | ........................... | 136/245 |
| 6,284,966 B1 * | 9/2001 | Simburger et al. | ........... | 136/244 |
| 6,343,442 B1 * | 2/2002 | Marks | ................................ | 52/71 |
| 7,023,962 B2 * | 4/2006 | Xu et al. | ........................ | 378/147 |
| 7,104,506 B1 | 9/2006 | Goodzeit | | |
| 8,308,111 B2 * | 11/2012 | Lu et al. | ........................ | 244/172.7 |

(Continued)

FOREIGN PATENT DOCUMENTS

| FR | 2635077 A1 | 9/1990 |
|---|---|---|
| FR | 2763747 A1 | 11/1998 |
| FR | 2863023 A1 | 6/2005 |

*Primary Examiner* — Christopher P Ellis
*Assistant Examiner* — Medhat Badawi
(74) *Attorney, Agent, or Firm* — Baker & Hostetler LLP

(57) ABSTRACT

A deployable structure with panels forming an antenna equipped with a solar generator includes: a set of antenna panels each having a substantially rectangular useful surface, the antenna panels abutting each other on first sides parallel to each other, at least one photovoltaic solar panel, each photovoltaic solar panel abutting an antenna panel on a second side of said antenna panel perpendicular to the first sides, first articulation systems, each of said articulation systems enabling an antenna panel to be caused to pivot relative to an adjacent antenna panel about an axis substantially parallel to the first sides of said antenna panels, a second articulation system for each photovoltaic solar panel, each of said articulation systems enabling a photovoltaic solar panel to be caused to pivot relative to the antenna panel that it abuts about an axis substantially parallel to the second side of said antenna panel.

6 Claims, 7 Drawing Sheets

(56) References Cited

U.S. PATENT DOCUMENTS

| | | | |
|---|---|---|---|
| 2003/0015625 A1* | 1/2003 | McGee et al. | 244/173 |
| 2008/0290222 A1* | 11/2008 | Aston et al. | 244/173.3 |
| 2009/0230250 A1* | 9/2009 | Wehner et al. | 244/172.7 |
| 2012/0325974 A1* | 12/2012 | Baudasse et al. | 244/172.6 |

* cited by examiner

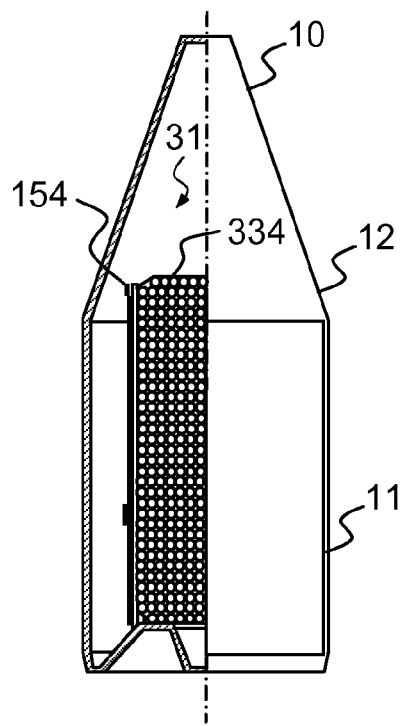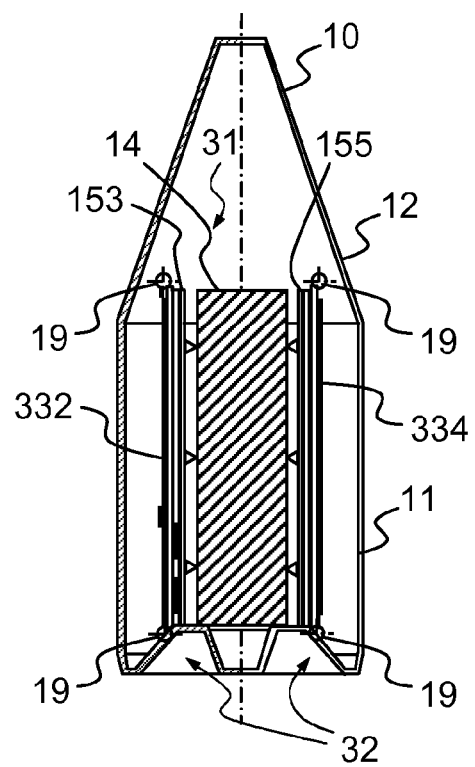
FIG.3A  FIG.3B
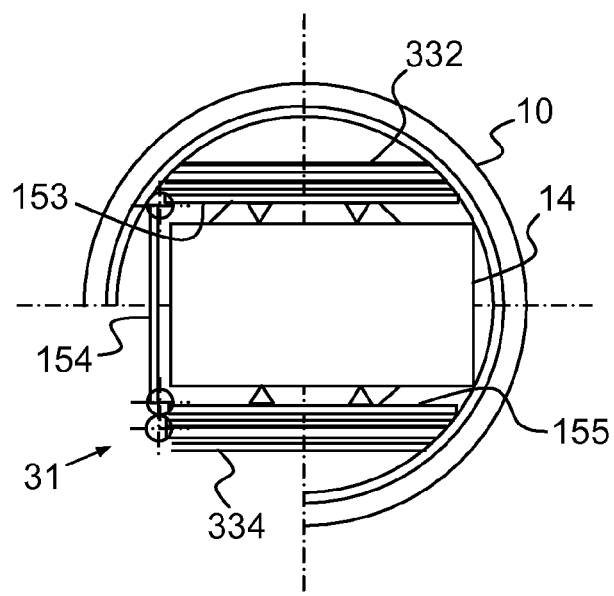
FIG.3C

DEPLOYABLE STRUCTURE FORMING AN ANTENNA EQUIPPED WITH A SOLAR GENERATOR FOR A SATELLITE

CROSS-REFERENCE TO RELATED APPLICATION

This application claims priority to foreign French patent application No. FR 1005094, filed on Dec. 23, 2010, the disclosure of which is incorporated by reference in its entirety.

FIELD OF THE INVENTION

The invention is situated in the field of deployable structures with which satellites may be equipped. It concerns one such deployable structure constituted of panels forming an antenna equipped with a solar generator.

BACKGROUND

Satellites are notably used as radar systems. To this end they include a radar antenna taking the form of a plane panel in the operating configuration. This plane panel generally has dimensions such that it cannot be placed in the operating configuration under the nose cone of the launch vehicle for placing the satellite in orbit. Consequently, a radar antenna is generally formed of a so-called deployable structure. Such a structure comprises a set of antenna panels articulated to each other in such manner as to be able to assume a stowed configuration for launch, in which the panels are stacked on each other, and an operating configuration after the satellite is placed in orbit, in which the antenna panels are deployed and form a plane panel. To be more precise, in the stowed configuration, the antenna panels are stacked on either side of the body of the satellite on two opposite faces. The panels are articulated to a central antenna panel fixed to a third face of the body. Satellites also necessitate a source of electrical energy, generally provided by solar generators including solar panels. Missions being increasingly "costly" in energy terms, they necessitate increasingly large solar panels. Increasing the size of the solar panels gives rise to problems, however, both for the stowed configuration and for the operating configuration of the radar antenna. In fact, the body of the satellite forms a parallelepiped-shaped overall volume the two faces of which on which the antenna panels are stacked in the stowed configuration have a greater width than the third face to which the central antenna panel is fixed. Consequently, the volume available for stowing solar panels on the face opposite the third face is relatively limited. In the operating configuration, the solar panels are deployed and moved away from the body of the satellite. Consequently, there is a risk of the antenna panels and the solar panels shading each other. The solar panels are liable to interfere with the operation of the radar antenna.

SUMMARY OF THE INVENTION

One aim of the invention is notably to remedy the aforementioned disadvantages by enabling a satellite to include an antenna formed by a deployable structure and relatively large solar panels, without the antenna and the solar panels shading each other. To this end, the invention consists in a deployable structure with which a satellite may be equipped, including:
  a set of antenna panels each having a substantially rectangular useful surface, the antenna panels abutting each other on first sides parallel to each other,
  at least one photovoltaic solar panel, each photovoltaic solar panel abutting an antenna panel on a second side of said antenna panel perpendicular to the first sides,
  first articulation systems, each of said articulation systems enabling an antenna panel to be caused to pivot relative to an adjacent antenna panel about an axis substantially parallel to the first sides of said antenna panels,
  a second articulation system for each photovoltaic solar panel, each of said articulation systems enabling a photovoltaic solar panel to be caused to pivot relative to the antenna panel that it abuts about an axis substantially parallel to the second side of said antenna panel.

The invention notably has the advantage that it enables the same stacking, deployment and articulation systems to be provided for the antenna panels and the solar panels.

BRIEF DESCRIPTION OF THE DRAWINGS

The invention will be better understood and other advantages will become apparent on reading the following description given with reference to the appended drawings, in which:

FIGS. 3A, 3B and 3C show diagrammatically, in elevation, in longitudinal section, and in cross section, respectively, the launch vehicle nose cone in which is installed a satellite comprising an example of a deployable structure of the invention in the stowed configuration;

DETAILED DESCRIPTION

Figure 1A:
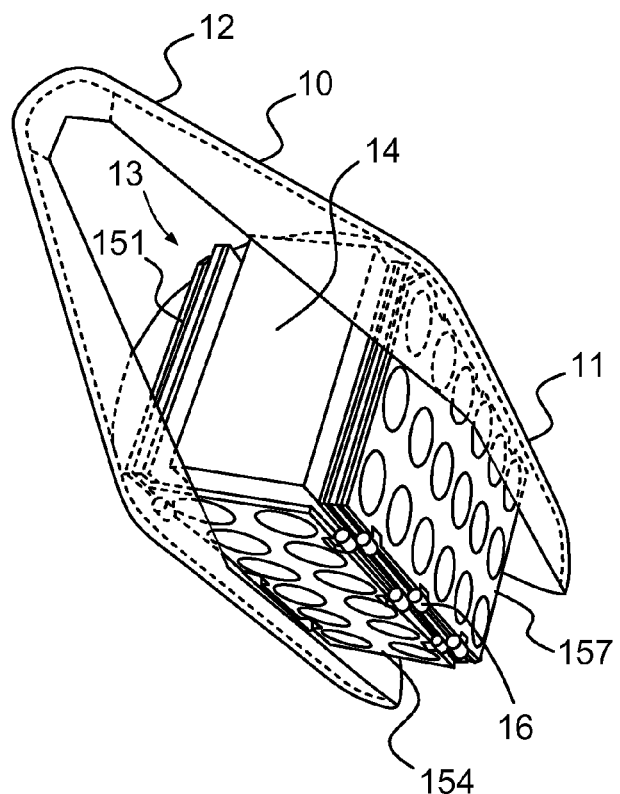
FIGS. 1A and 1B show diagrammatically, in perspective and in cross section, respectively, a launch vehicle nose cone in which is installed a satellite comprising a radar antenna in a stowed configuration.
Figure 1B:
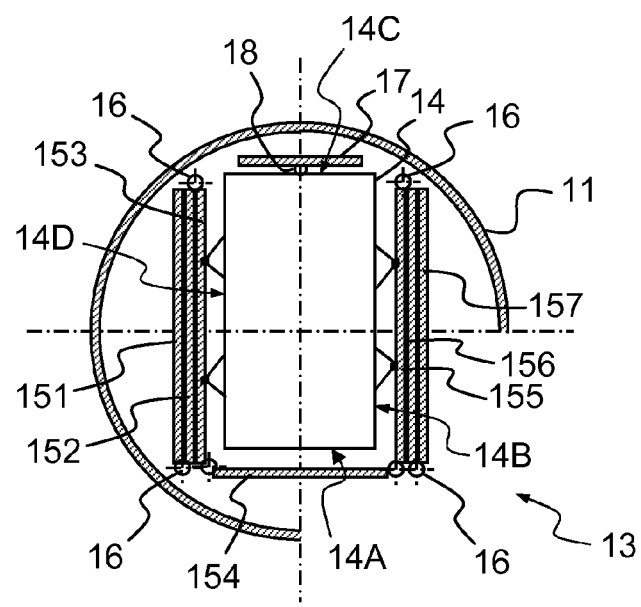

FIGS. 1A and 1B show diagrammatically, in perspective and in cross section, respectively, a launch vehicle nose cone in which is installed a satellite comprising a radar antenna in a stowed configuration. The launch vehicle nose cone 10 comprises a hollow cylindrical portion 11 and a conical portion 12. A satellite 13 is installed in the hollow cylindrical portion 11. The satellite 13 includes a body 14 of parallelepiped overall shape. The body 14 has four exterior lateral faces 14A, 14B, 14C and 14D adapted to received deployable structures. Here, the satellite 13 is equipped with a deployable antenna 15 formed of a set of antenna panels 151 to 157 articulated to each other by articulation systems 16. The antenna panels 151-157 have a substantially rectangular shape. A first antenna panel 154 is fixed to the face 14A of the body 14. The face 14A and the opposite face 14C have a width less than the faces 14B and 14D. The antenna panel 154 or, directly, the satellite 13 is connected to two other antenna panels 153 and 155 by articulation systems 16. The antenna panels 153 and 155 are respectively connected to an antenna panel 152 and to an antenna panel 156 by articulation systems 16. The antenna panels 152 and 156 are themselves connected to antenna panels 151 and 157 by articulation systems 16. In the stowed configuration shown in FIGS. 1A and 1B, the antenna panels 151 to 153, on the one hand, and 155 to 157, on the other hand, are stacked parallel to each other. The antenna panels 151-153 are folded relative to the antenna panel 154 in such manner that the antenna panel 153 comes to bear on the face 14D of the body 14. The antenna panels 155-157 are folded relative to the antenna panel 154 in such manner that the antenna panel 155 comes to bear on the face 14B of the body 14. The satellite 13 is also equipped with a solar generator comprising a photovoltaic solar panel 17 connected to the face 14C by an extender arm 18. The antenna panels 151-157 must be able to form a relatively extensive antenna surface. For this reason, they are stacked on the wider faces 14B and 14D. The volume available for the solar panel 17 is therefore small. The solar panel 17 may therefore only with difficulty have large dimensions.

Figure 2:
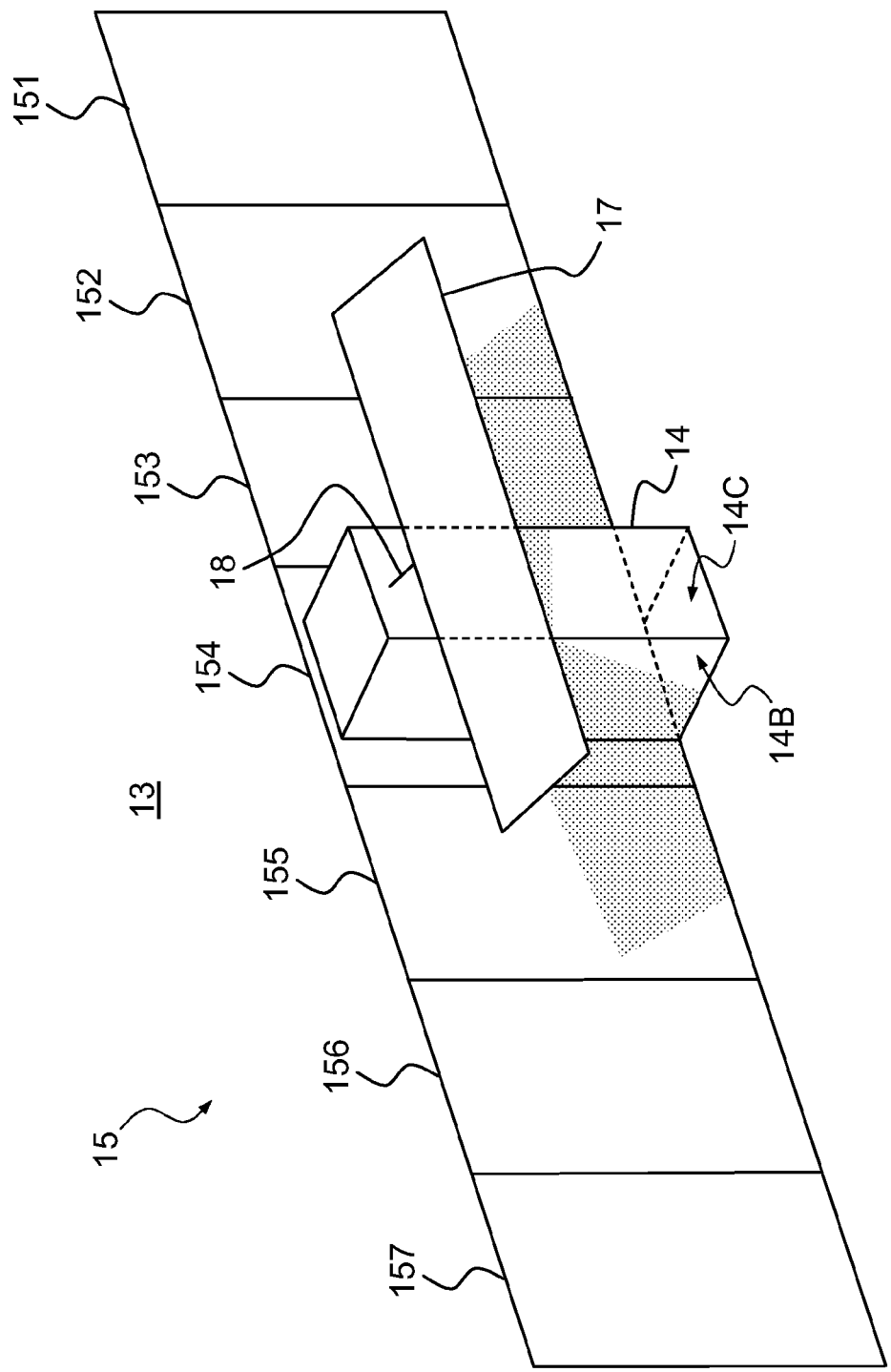
FIG. 2 shows diagrammatically in perspective the satellite from FIGS. 1A and 1B equipped with the radar antenna in an operating configuration.

FIG. 2 shows diagrammatically in perspective the satellite 13 equipped with the deployable antenna 15 in the operating configuration, also called the operational configuration. In this configuration, the antenna panel 154 abuts the antenna panels 153 and 155 on two opposite sides. In an analogous manner, the antenna panels 151 and 152, on the one hand, and 156 and 157, on the other hand, abut the antennas 153 and 155, respectively, in series in such manner as to form a substantially plane and continuous rectangular general useful surface. The solar panel 17 is moved away from the body 14 by the extender arm 18. In some configurations of the satellite 13 relative to the orientation of the antenna 15 and the solar panel 17, as well as the relative position of the sun, the solar panel 17 is liable to form a screen between the sun and the antenna 15. The operation of the antenna 15 is then degraded because of the thermoelastic deformations that it undergoes.

FIGS. 3A, 3B and 3C show diagrammatically in elevation, in longitudinal section and in cross section, respectively, a launch vehicle nose cone in which is installed a satellite comprising an example of a deployable structure of the invention in the stowed configuration. The satellite 31 of the invention essentially differs from the satellite 13 described with reference to FIGS. 1A, 1B and 2 in that it is equipped with a deployable structure 32 including both the antenna panels 151 to 157 forming the deployable antenna 15 and solar panels 331 to 334. The deployable antenna 15 with which the satellite 31 is equipped is substantially identical to that with which the satellite 13 is equipped. The first antenna panel 154 is fixed to the face 14A of the body 14. The antenna panels 151 to 153, on the one hand, and 155 to 157, on the other hand, are connected in series on either side of the antenna panel 154 by the articulation systems 16. These antenna panels 151-153 and 155-157 may be fixed either to the body 14 of the satellite 13 or to the antenna panel 154. In the stowed configuration shown in FIGS. 3A, 3B and 3C the antenna panels 151-153, on the one hand, and 155-157, on the other hand, are stacked parallel to each other. The antenna panels 151-153 are folded relative to the antenna panel 154 in such manner that the antenna panel 153 comes to bear on the face 14D of the body 14. The antenna panels 155-157 are folded relative to the antenna panel 154 in such manner that the antenna panel 155 comes to bear on the face 14B of the body 14. The deployable structure 32 further comprises four solar panels 331 to 334. The solar panels 331 and 332 are connected to the antenna panel 151 by articulation systems 19. The solar panels 333 and 334 are connected to the antenna panel 157 by articulation systems 19. In the stowed configuration shown in FIGS. 3A, 3B and 3C the antenna panels 151-153 and the solar panels 331 and 332 are stacked parallel to each other, the antenna panel 153 bearing on the face 14D of the body 14, and the solar panel 332 forming the final exterior layer of the stack of panels. The antenna panels 155-157 and the solar panels 333 and 334 are stacked parallel to each other, the antenna panel 155 bearing on the face 14B of the body 14, and the solar panel 334 forming the final exterior layer of the stack of panels. This position enables them to be opened in the first phases of placing the satellite 13 in orbit, thus supplying the satellite with electrical energy. This partial opening ensures the survival of the spacecraft and facilitates controlling it during station insertion because of a deployed structure of small size. The width of the solar panels 331-334 may be slightly less than that of the antenna panels 151-157 in such manner as to conform to the space available in the hollow cylindrical portion 11 of the launch vehicle nose cone 10.

Figure 4:
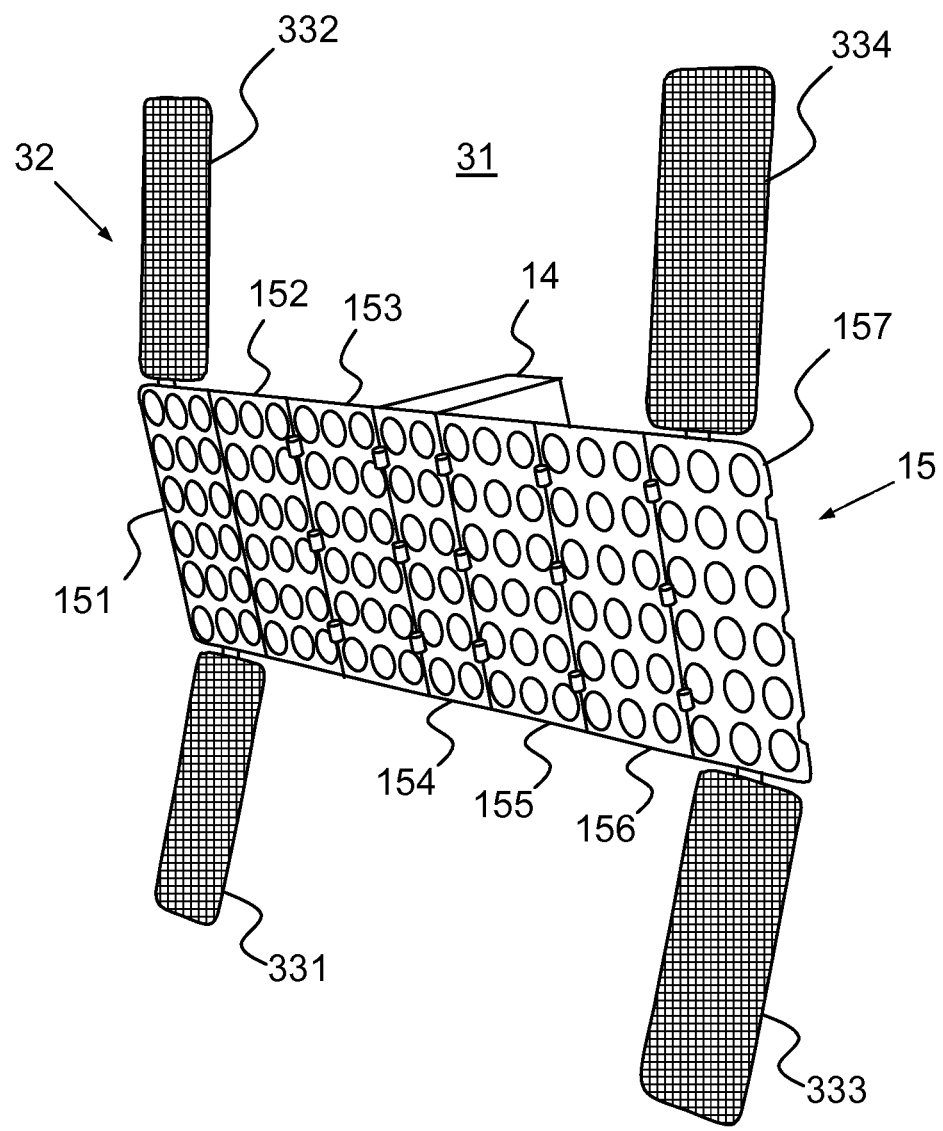
FIG. 4 shows diagrammatically in perspective the satellite comprising the deployable structure from FIGS. 3A, 3B and 3C in the operating configuration.

FIG. 4 shows diagrammatically in perspective the satellite 31 equipped with the deployable structure 32 in the operating configuration. In this configuration, the antenna panels 151-157 abut in series on their wider sides in such manner as to form a substantially plane and continuous rectangular overall useful surface 15A. The solar panels 331 and 332 are deployed on either side of the antenna panel 151. The antenna panel 151 abuts on one of its narrower sides one of the narrower sides of the solar panel 331 and on the opposite side one of the narrower sides of the solar panel 332. In an analogous manner, the solar panels 333 and 334 are deployed on either side of the antenna panel 157. The antenna panel 157 abuts on one of its narrower sides one of the narrower sides of the solar panel 333 and on the opposite side one of the narrower sides of the solar panel 334. The solar panels 331-334 are not necessarily deployed in the same plane as the useful surface 15A of the deployable antenna 15. They may each be at an angle to the useful surface of the antenna panels in such manner as to be oriented toward the solar radiation.

To be able to go from the stowed configuration to the operating configuration, the deployable structure 32 includes articulation systems 16 and 19. These articulation systems 16 and 19 may be structurally identical for the connections between antenna panels 151-157 and for the connections between antenna panels 151, 157 and solar panels 331-334. They may equally be different, as is generally the case when a deployable structure is adapted to be deployed with two different orthogonal orientations. An example of an articulation 19 is notably to be found in the patent FR 2635077. Each articulation system 16 or 19 must be able to cause one panel to pivot relative to another about an axis substantially parallel to the useful surfaces of those panels. The rotation axes of the articulation systems 16 between the different antenna panels 151-157 are substantially parallel to each other and to the wider sides of the antenna panels 151-157. The rotation axes of the articulation systems 19 between an antenna panel 151, 157 and a solar panel 331-334 are substantially parallel to the narrower sides of said panels.

Figure 5A:
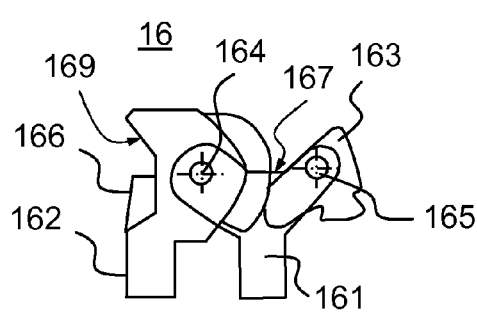
FIGS. 5A, 5B, 5C and 5D show diagrammatically an example of an articulation system enabling two panels of the deployable structure to be connected to each other.
Figure 5B:
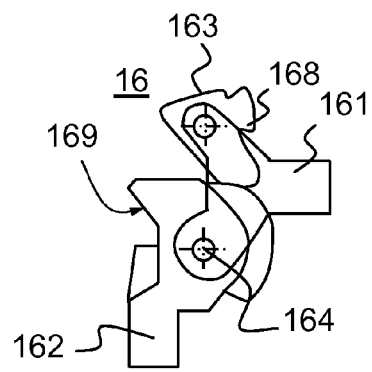
Figure 5C:
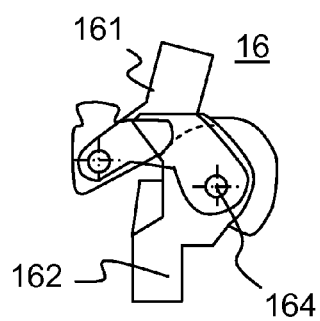
Figure 5D:
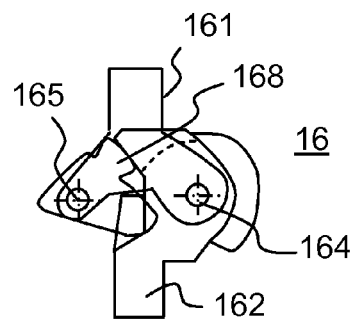

FIGS. 5A to 5D show an example of an articulation system for connecting two panels to each other. There is considered by way of example the articulation system 16 between the antenna panel 151 and the antenna panel 152. FIG. 5A shows the articulation system in a position corresponding to the stowed configuration. FIGS. 5B and 5C show the articulation system 16 in positions in which antenna panels 151 and 152 are being deployed relative to each other. FIG. 5D shows the articulation system 16 in a position corresponding to the operating configuration, the antenna panels 151 and 152 being deployed. The articulation system 16 includes a first part 161 on which the antenna panel 151 is to be mounted, a second part 162 on which the antenna panel 152 is to be mounted, and a third part 163. The second part 162 is connected to the first part 161 to pivot about a first axis 164. The third part 163 is connected to the first part 161 to pivot about a second axis 165 substantially parallel to the first axis 164. The second part 162 includes a stop 166 adapted to come to bear on a bearing surface 167 of the first part 161 in the position corresponding to the operating configuration, as shown in FIG. 5D. The stop 166 and the bearing surface 167 enable limitation of the rotation movement between the first and second parts 161, 162 once the position corresponding to the operating configuration has been reached. The third part 163 includes a non-return stop 168 adapted to come to bear on a bearing surface 169 of the second part 162 in the position corresponding to the operating configuration. The non-return stop 168 and the bearing surface 169 enable prevention of rotation movement between the first and second parts 161, 162 toward the stowed position once the deployed position has been reached. Thus the articulation systems 16 have both a rotation guidance function and a panel locking function. They may equally have a drive function consisting in driving the panels from the stowed configuration to the operating configuration. The drive torque is provided by a spiral spring, for example. Deployment of the panels may be triggered by a known prior art pyrotechnic device.

Figure 6A:
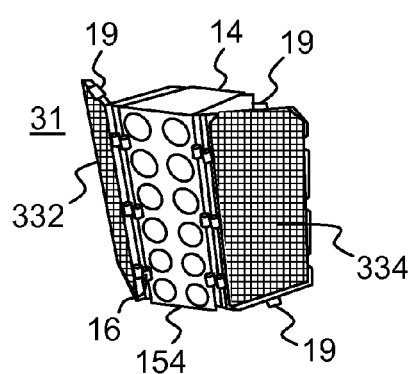
FIGS. 6A, 6B, 6C, 6D and 6E show an example of a deployment kinematic for the deployable structure from FIGS. 3A, 3B, 3C and 4.
Figure 6B:
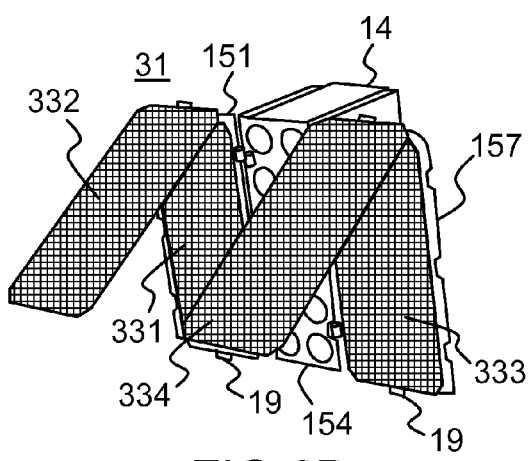
Figure 6C:
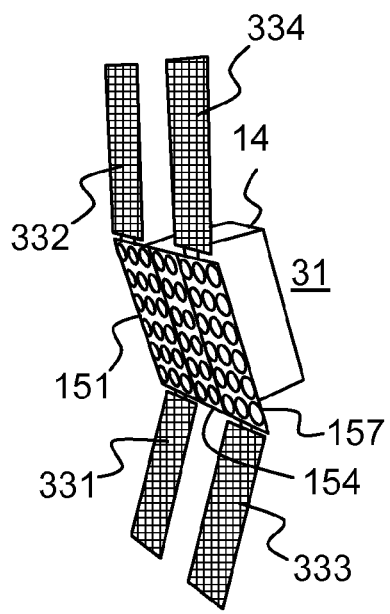
Figure 6D:
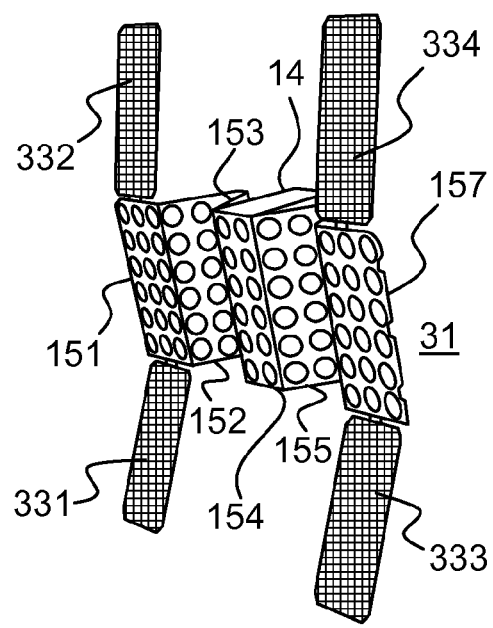
Figure 6E:
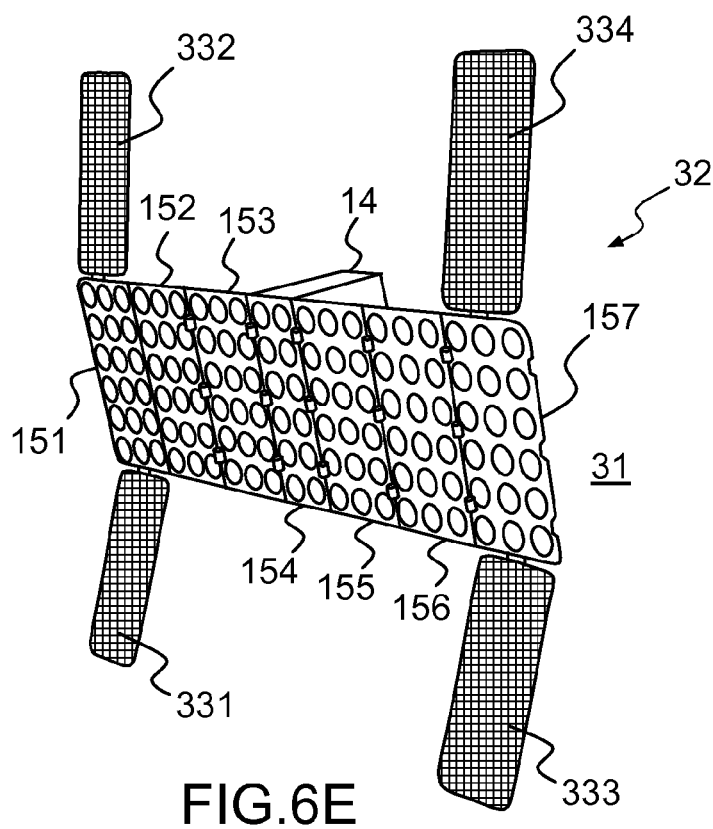

FIGS. 6A to 6E show an example of a deployment kinematic for the deployable structure shown in FIGS. 3A, 3B, 3C and 4. FIG. 6A shows the satellite 31 in a first step of the deployment of the deployable structure 32. In this step, the antenna panels 151 and 157 are deployed. They are driven in rotation relative to the antenna panels 152 and 156, respectively, about two axes substantially parallel to the wider sides of the antenna panels 152 and 156. The solar panels 331-334 being connected to the antenna panels 151 and 157, they are also driven in rotation about these axes. The antenna panels 152, 153, 155 and 156 remain stacked against the faces 14B and 14D of the body 14 of the satellite 31. FIG. 6B shows the satellite 31 in a second step of the deployment of the deployable structure 32. This second step begins when the antenna panels 151 and 157 have reached their position corresponding to the operating configuration of the antenna 15. The antenna panels 151 and 157 then form with the antenna panel 154 a plane surface. In the second step, the solar panels 332 and 334 are deployed. They are driven in rotation relative to the antenna panels 151 and 157, respectively, about two axes substantially parallel to the narrower sides of the antenna panels 151 and 157. The antenna panels 152, 153, 155 and 156 remain stacked against the body 14. The solar panels 332 and 334 are deployed until they reach the required position in the operating configuration. The solar panels 331 and 333 are then deployed in a third step. Opening of the solar panels 331 and 333 may be commanded by locking the articulation systems 16 for opening the antenna panels 151 and 157. The solar panels 331 and 333 are driven in rotation relative to the antenna panels 151 and 157, respectively, about two axes substantially parallel to the narrower sides of the antenna panels 151 and 157. The solar panels 331 and 333 are deployed until they reach the required position in the operating configuration. That position is shown in FIG. 6C. FIG. 6D shows the satellite 31 in a fourth step of the deployment of the deployable structure 32. In this step, the antenna panels not yet deployed are deployed. Here, the antenna panels 152, 153, 155 and 156 are driven in rotation simultaneously relative to the antenna panels 151, 154 and 157 about axes substantially parallel to the wider sides of those antenna panels. The antenna panels 152 and 153, on the one hand, and 155 and 156, on the other hand, are also driven in rotation relative to each other about two axes substantially parallel to the wider sides of these panels. The antenna panels 152, 153, 155 and 156 are deployed until they reach their position corresponding to the operating configuration shown in FIG. 6E.

The deployment kinematic for the deployable structure 32 may differ from that described in with reference to FIGS. 6A to 6E. Here deployment of the antenna panels 152-153 and 155-157 and the solar panels 331-334 may be triggered before the end of deploying the antenna panels 151 and 157.

Figure 7:
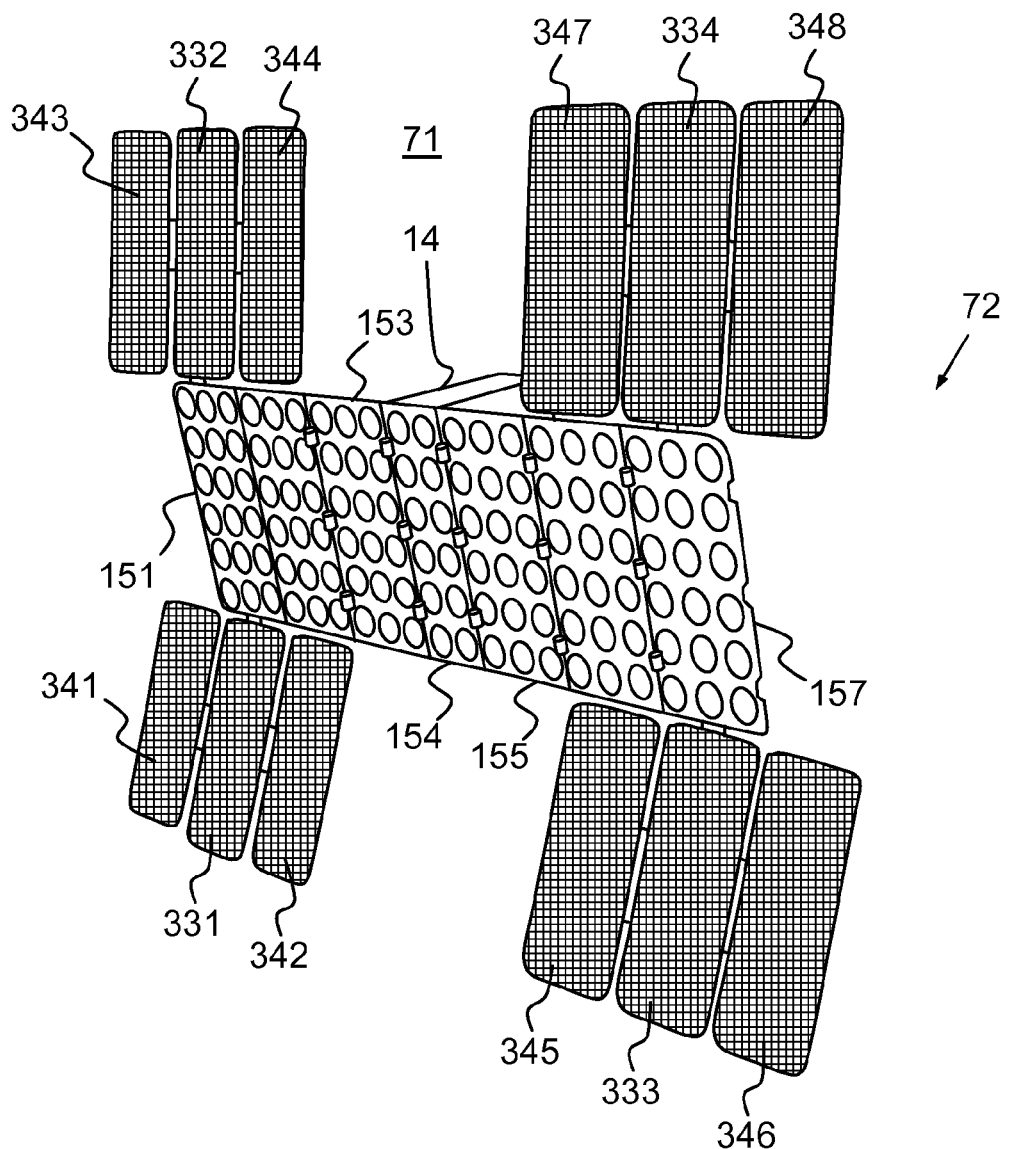
FIG. 7 shows diagrammatically in perspective a satellite comprising another example of a deployable structure of the invention in the operating configuration.

The deployable structure 32 may include a greater number of solar panels than that shown in FIGS. 3A, 3B, 3C and 4. FIG. 7 shows diagrammatically in perspective a satellite 71 equipped with an example of a deployable structure 72 of the invention including twelve solar panels in the operating configuration. Relative to the deployable structure 32 of the satellite 31, the deployable structure 72 includes an additional solar panel on each side of each solar panel 331-334. In other words, each solar panel comprises a main solar panel connected to one of the antenna panels 151 or 157 and secondary solar panels 341-348 connected to that main solar panel 331-334. The main solar panel 331 abuts a first secondary solar panel 341 on one of its longer sides and a second secondary solar panel 342 on its opposite side. Thus the solar panels 331, 341 and 342 form a substantially plane rectangular useful surface. The solar panel 342 abuts on its narrower side the antenna panel 152 without being mechanically connected to that panel. In an analogous manner, main solar panels 332, 333 and 334 each abut a first secondary solar panel 343, 345 and 347, respectively, and a second secondary solar panel 344, 346 and 348, respectively, on their longer sides. The solar panels 331-334 and 341-348 may be connected together by the same articulation systems as connect the antenna panels 151-157 to each other and the antenna panels 151, 157 to the main solar panels 331-334. Each articulation system enables a secondary solar panel 341-348 to be caused to pivot relative to a main solar panel 331-334 about an axis parallel to the longer sides of the solar panels. One advantage of articulating the solar panels to each other rather than articulating them individually to an antenna panel is that all of the solar panels may be oriented by a single articulation system, namely that between the main solar panel 331, 332, 333 or 334 and the antenna panel 151 or 157. The articulation systems between the solar panels may be much simpler since they must be configured only for one stable position, namely that corresponding to the operating configuration in which the panels are in the same plane. In the stowed configuration, the secondary solar panels 341-348 may be folded parallel to the main solar panel 331-334 to which they are connected. The deployment of the deployable structure 72 then includes an additional step consisting of driving the secondary solar panels 341-348 in rotation relative to the main solar panels 331-334 about axes substantially parallel to the wider sides of those solar panels. The opening of the solar panels 341-348 may be commanded by locking the articulation systems 19 enabling opening of the main solar panels 331-334. The main solar panels 331-334 and secondary solar panels 341-348 may equally be arranged in the stowed configuration in such manner as to be able to supply electrical energy by deploying only the antenna panels 151 and 157. Of course, the deployable structure of the invention may include any number of solar panels connected to any antenna panel or to any solar panel.

The invention claimed is:

1. A deployable structure with which a satellite may be equipped, comprising:
   a set of antenna panels each having a substantially rectangular useful surface, the antenna panels abutting each other on first sides parallel to each other, at least one photovoltaic solar panel, each photovoltaic solar panel having a substantially rectangular useful surface and abutting an antenna panel on a second side of said antenna panel perpendicular to the first sides, first articulation systems, each of said articulation systems enabling an antenna panel to be caused to pivot relative to an adjacent antenna panel about an axis substantially parallel to the first sides of said antenna panels, a second articulation system for each photovoltaic solar panel, each of said articulation systems enabling a photovoltaic solar panel to be caused to pivot relative to the antenna panel that it abuts about an axis substantially parallel to the second side of said antenna panel, at least one photovoltaic solar panel comprising a main photovoltaic solar panel and at least one secondary photovoltaic solar panel, the main photovoltaic solar panel abutting the antenna panel concerned, each secondary photovoltaic solar panel abutting the main photovoltaic solar panel on one of the sides perpendicular to the side on which the main photovoltaic solar panel abuts the antenna panel concerned, the deployable structure further including a third articulation system for each secondary photovoltaic solar panel, each of said articulation systems enabling the secondary photovoltaic solar panel to be caused to pivot relative to the main photovoltaic solar panel about an axis substantially parallel to the sides on which they abut.

2. A deployable structure according to claim 1, wherein at least one photovoltaic solar panel comprising a main photovoltaic solar panel and at least one secondary photovoltaic solar panel further comprises at least one tertiary photovoltaic solar panel, each tertiary photovoltaic solar panel abutting a secondary photovoltaic solar panel or another tertiary photovoltaic solar panel on sides parallel to the sides on which the primary and secondary solar panels abut each other, the deployable structure further including a third articulation system for each tertiary photovoltaic solar panel, each of said articulation systems enabling the tertiary photovoltaic solar panel to be caused to pivot relative to the photovoltaic solar panel it abuts about an axis substantially parallel to the sides on which the primary and secondary photovoltaic solar panels and tertiary photovoltaic solar panels abut each other.

3. A deployable structure according to claim 1, configured in such manner that, in a stowed configuration, antenna panels and the solar panels are stacked parallel to each other and in such manner that, in an operating configuration, the antenna panels form a substantially plane and continuous general useful surface and each solar panel forms a substantially plane and continuous local useful surface.

4. A deployable structure according to claim 1, wherein one of the antenna panels is configured to be fixed to a first face of a body of the satellite, antenna panels of a first sub-set and the photovoltaic solar panels abutting one of the antenna panels of the first sub-set being adapted to be stacked against a second face of the body, antenna panels of a second sub-set and the photovoltaic solar panels abutting one of the antenna panels of the second sub-set being adapted to be stacked against a third face of the body, the second and third faces of the body being substantially perpendicular to the first face of the body.

5. A deployable structure according to claim 4, wherein the antenna panels of the first sub-set and the photovoltaic solar panels abutting one of the antenna panels of the first sub-set are adapted to be stacked in such manner that one of said photovoltaic solar panels forms the final exterior layer of the stack of panels, the antenna panels of the second sub-set and the photovoltaic solar panels abutting one of the antenna panels of the second sub-set being configured to be stacked in such manner that one of said photovoltaic solar panels forms the last exterior layer of the stack of panels.

6. A deployable structure according to claim 5, wherein the photovoltaic solar panels forming a final exterior layer of a stack of panels are configured to be stacked in such manner that their useful surface is oriented outward.

* * * * *